(12) United States Patent
Smith (10) Patent No.: US 8,275,946 B1
(45) Date of Patent: Sep. 25, 2012

(54) CHANNEL TAGS IN MEMORY COMPONENTS FOR OPTIMIZING LOGICAL TO PHYSICAL ADDRESS TRANSLATIONS

(75) Inventor: Ronald Smith, Phoenix, AZ (US)

(73) Assignee: Marvell International Ltd. (BM)

( * ) Notice: Subject to any disclaimer, the term of this patent is extended or adjusted under 35 U.S.C. 154(b) by 807 days.

(21) Appl. No.: 12/105,794

(22) Filed: Apr. 18, 2008

Related U.S. Application Data (60) Provisional application No. 60/912,789, filed on Apr. 19, 2007.

(51) Int. Cl.
*G06F 12/00* (2006.01)
*G06F 13/00* (2006.01)
*G06F 13/28* (2006.01)

(52) U.S. Cl. ........................................ 711/137
(58) Field of Classification Search ............... 711/137
See application file for complete search history.

(56) References Cited

U.S. PATENT DOCUMENTS

| 5,987,621 | A | * | 11/1999 | Duso et al. | 714/4 |
| 2004/0006671 | A1 | * | 1/2004 | Handgen et al. | 711/137 |
| 2005/0278480 | A1 | * | 12/2005 | Watanabe et al. | 711/103 |
| 2006/0047914 | A1 | * | 3/2006 | Hofmann et al. | 711/137 |
| 2006/0179236 | A1 | * | 8/2006 | Shafi | 711/137 |
| 2009/0138661 | A1 | * | 5/2009 | Lauterbach | 711/137 |

* cited by examiner

*Primary Examiner* — Kevin Ellis
*Assistant Examiner* — Chad Davidson (57) ABSTRACT

A method and system for performing logical to physical address translations in a memory is disclosed, wherein the memory includes a translation cache containing a subset of a plurality of entries mapping logical block addresses to physical locations of the memory. Aspects of the exemplary embodiment include receiving from a processor a read/write request for a logical block and context information regarding the logical block, the context information including at least one of a relationship of the logical block to other logical blocks and a description of future activity associated with the logical block; and pre-fetching a first entry into the translation cache based on the context information so that the first entry required to satisfy a future request is available in the translation cache when the future request is received.

25 Claims, 6 Drawing Sheets

Receive from a processor a read/write request for a logical block and context information regarding the logical block, the context information including at least one of a relationship of the logical block to other logical blocks, and a description of future activity associated with the logical block
200

Pre-fetch a first entry into the translation cache based on the context information so that the first entry required to satisfy a future request is available in the translation cache when the future request is received
202

| R/W Command 302 | Address 304 | Data Packet 306 | Channel ID 308 | EFB Field 310 |
|---|---|---|---|---|
| | | | | EFB Semantic 312 |

CHANNEL TAGS IN MEMORY COMPONENTS FOR OPTIMIZING LOGICAL TO PHYSICAL ADDRESS TRANSLATIONS

CROSS-REFERENCE TO RELATED APPLICATIONS

This application claims the benefit of provisional Patent Application Ser. No. 60/912,789, filed Apr. 19, 2007, assigned to the assignee of the present application, and incorporated herein by reference.

BACKGROUND

Flash memory is one type of non-volatile, rewritable memory commonly used in many types of electronic devices, such as USB drives, digital cameras, mobile phones, and memory cards. Flash memory typically stores information in an array of memory cells made from floating-gate transistors. In traditional single-level cell (SLC) devices, each cell stores only one bit of information. Some newer flash memory, known as multi-level cell (MLC) devices, can store more than one bit per cell by applying multiple levels of electrical charge to the floating gates of memory cells.

A NAND memory is accessed by a host system much like a block device such as a hard disk or a memory card. Typically, the host system performs reads and writes to logical block addresses. A NAND memory is typically divided into blocks and each block is generally organized into pages or sectors of cells. Blocks may be typically 16 KB in size, while pages may be typically 512 or 2,048 or 4,096 bytes in size. Multi-level NAND cells makes management of NAND devices more difficult, particularly in multithreaded real-time run-time environments.

In response, manufacturers have encapsulated NAND flash as memory devices in which a controller is placed in front of a raw NAND memory. The purpose of the controller is to manage the underlying physical characteristics of the NAND memory and to abstract the interface as a logical block device. This allows the NAND memory to provide a logical to physical translation map between logical block addresses (which are being accessed by a host system) and physical locations in the NAND memory, and to manage rules governing the logical to physical translation mapping internally via firmware in a NAND controller.

A translation cache is a type of cache that may be used by managed NAND memories to improve the speed of logical to physical translations. The translation cache has a fixed number of entries that map the logical block addresses onto the physical addresses (e.g., NAND pages). The translation cache can be searched by a requested logical block address and the result is the physical address. If the requested address is present in the translation cache, the search yields a match very quickly, after which the physical address can be used to access the managed NAND memory. If the requested address is not in the translation cache, the translation proceeds by reading translation tables, which contain a larger set of translation entries, and are slower to access.

One problem with respect to the translation process is that the managed NAND memory does not have a global view of the semantics of the logical block accesses, and cannot therefore readily perform any internal optimization. The only information currently transmitted to a managed NAND memory is the logical block being accessed and whether the operation is a read or write. All other context about a particular logical block, both in its relation to other logical blocks and in relation to past and future events is lost.

BRIEF SUMMARY

The present invention provides a method and system for performing logical to physical address translations in a memory. The memory includes a translation cache containing a subset of a plurality of entries mapping logical block addresses to physical locations of the memory. Aspects of the exemplary embodiment include receiving from a processor a read/write request for a logical block and context information regarding the logical block, wherein the context information includes at least one of a relationship of the logical block to other logical blocks and a description of future activity associated with the logical block; and pre-fetching a first entry into the translation cache based on the context information so that the first entry required to satisfy a future request is available in the translation cache when the future request is received.

According to the method and system disclosed herein, by enabling a memory, such as a NAND memory, to receive not only information about a logical block being accessed and whether the request is a read or write, but other context, including the logical block's relation to other logical blocks and the logical block's relation to past and future activity, the exemplary embodiments provide the memory with a global view of the semantics of the logical block accesses and allow the memory to perform internal optimizations. Such internal optimizations can include optimizing data availability in a translation cache to satisfy logical to physical translations in response to future logical block accesses, such that cache misses are minimized.

DETAILED DESCRIPTION

The present invention relates to use of channel tags in memory components for optimizing translations—e.g., logical-to-physical address translations. The following description is presented to enable one of ordinary skill in the art to make and use the invention and is provided in the context of a patent application and its requirements. Various modifications to the embodiments and the generic principles and features described herein can be made. Thus, the present invention is not intended to be limited to the embodiments shown, but is to be accorded the widest scope consistent with the principles and features described herein.

One or more embodiments disclosed herein provide for use of channel tags in memory components, e.g., a NAND memory, for optimizing logical-to-physical address translations. The exemplary embodiments will be described in terms of NAND memory components. However, the exemplary embodiments may be used with any type of non-volatile memory management system or device in which garbage collection is necessary, such as any other type of FLASH memory or other types of memories, including phase change memory, for instance. The exemplary embodiments will also be described in the context of particular methods having certain steps. However, the method and system operate effectively for other methods having different and/or additional steps not inconsistent with the exemplary embodiments. In addition, one or more steps of the methods discussed below may be performed concurrently or in a different order to achieve desirable results.

Figure 1:
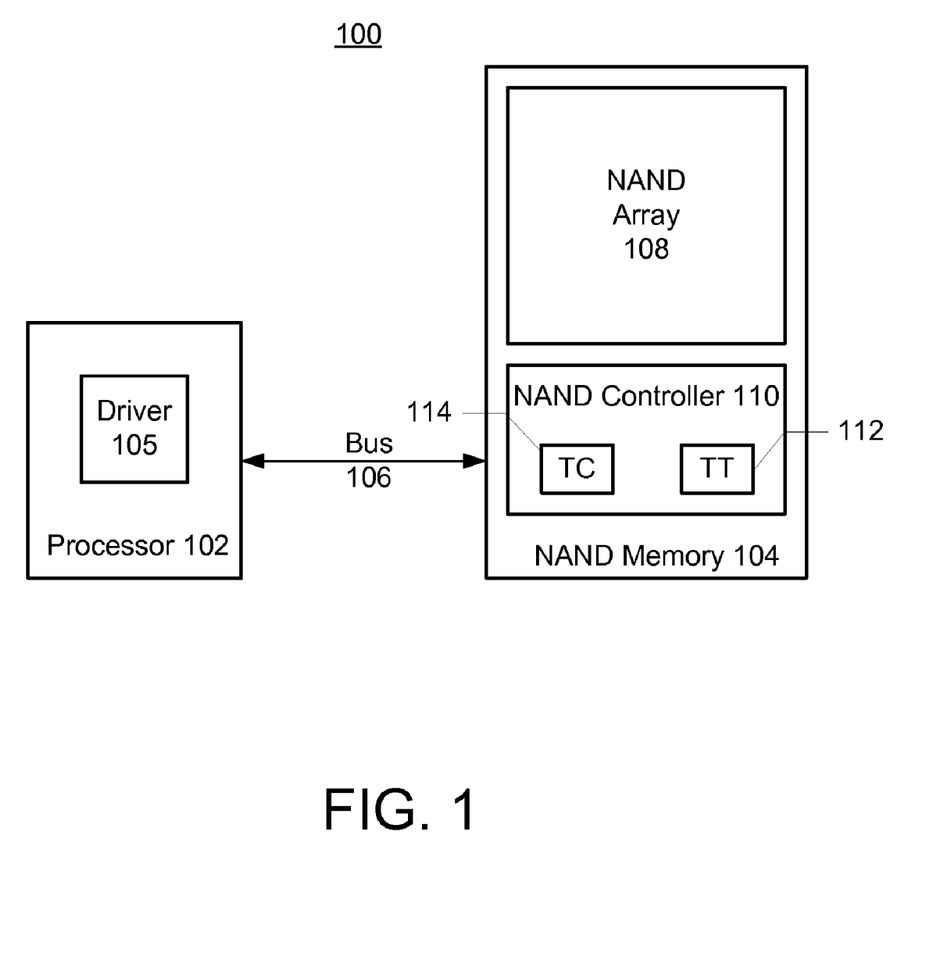
FIG. 1 is a block diagram illustrating an exemplary memory system.

FIG. 1 is a block diagram illustrating an exemplary memory system 100. The memory system 100 includes a processor 102 coupled to a NAND memory 104 via a bus interface 106. The processor 102 may be part of a host system that may be any type of electronic device that uses non-volatile memory, such as flash memory, including but not limited to a computer, an embedded device, or a handheld device, such as a cell phone, camera, a media/game player/recorder, a monitor, or a personal digital assistant (PDA), for instance.

The NAND memory 104 (e.g., a managed NAND) includes a NAND array 108 and a NAND controller 110. In one implementation, the NAND controller 110 performs memory management functions for the NAND array 108 and executes algorithms. The NAND controller 110 can be any type of memory controller that manages memory access, including but not limited to flash disk controllers or central processing units (CPUs). Through the NAND controller 110, the NAND memory 104 may offer configurable interfaces that make the NAND memory 104 adaptable to different processor and memory types. Example standard interfaces for memory devices include CompactFlash® MultiMediaCard (MMC), Sony Memory Stick®, Secure Digital (SD) card, and the like. The processor interface to the NAND memory 104 may be in the form of a software driver 105 that is executable by the processor 102. In one implementation, the software driver 105 implements the features required by the processor interface to the NAND memory 104. The NAND memory 104 can be separate from, or part of, the host system. The processor 102 and the NAND memory 104 may be implemented as individual chips, a chipset, or as a system-on-a-chip (SoC).

The NAND controller 110 performs translation management that maps logical blocks accessed by high-level software from the host system into physical locations in the NAND array 108. To do so, the NAND controller 110 maintains a logical to physical translation map between logical block addresses supplied by the processor 102 and a physical list of pages in the NAND array 108. In one implementation, the NAND controller 110 implements the translation map as one or more translation tables 112 in a relatively small amount of volatile storage. The logical to physical translation mappings may also be referred to simply as "logical to physical translations".

The processor 102 sends read and write requests to the NAND controller 110 as commands over the bus 106. In one implementation, the format includes a command, an address, and an optional data packet. In one implementation, the command indicates whether to read or write; the address is a logical address or logical block on which the command is being performed; and in the case of a write command, the data packet is the data to be written. Once the NAND controller 110 receives the commands, the NAND controller 110 translates the commands into memory access requests for the NAND array 108.

The translation tables 112 contain a set of entries mapping logical block addresses (e.g., logical block numbers) in the commands from the processor 102 to either an actual physical location/address of data in the NAND array 208 or to an unallocated block algorithm. The translation tables 112 can be searched by a requested logical block address, and the result is the physical address. When the NAND controller 110 receives a request to read a logical block address from the processor 102, the NAND controller 110 looks-up the logical block address in the translation tables 112 to find the logical block's physical address. The data located at this physical address is then retrieved and returned to the processor 102. A similar process occurs in response to receiving a write request, except that the NAND controller 110 uses the unallocated block algorithm to allocate new physical blocks that are mapped to the logical block(s) to be written to.

Because there is no limit to the amount of logical to physical block indirection (except that imposed by the total storage space), but there is a limit to the size of the translations tables 112, the NAND controller 110 maintains a translation cache 114 of the logical to physical translations to optimize throughput. The translation cache 114 has a fixed number of entries for caching a subset of the logical to physical translations stored in the translation tables 112. The translation cache 114 can be searched by a requested logical block address, and the result is the physical address. If the requested address is present in the translation cache, the search yields a match very quickly, after which the physical address can be used to access the NAND memory 104. If the requested address is not in the translation cache 114, a cache miss occurs. Whenever the requested logical block address cannot be found in the translation cache 114 and a cache miss occurs, it is necessary for the NAND controller 110 to scan the translation tables 112 to find this logical block and corresponding physical translation, and replace an old entry in the translation cache 114 with this currently active entry.

An algorithm (such as least recently used or set associative, or other commonly used caching algorithms) may be used take advantage of a presumed temporal or spatial locality and to manage the translation cache 114. However, in the absence of that kind of correlation, when the translation cache 114 misses, it is necessary for the NAND controller 110 to perform additional read operations on the translation tables 112 that were not requested by the processor 102. These additional read operations add to the delays and also add to the overall uncertainty of the performance of the NAND memory.

Accordingly, the exemplary embodiment provides a method and system for using channel tags in the memory system 100 for optimizing the logical to physical address translations. The exemplary embodiment allows an application executing in the processor 102 to communicate information about a stream of logical block addresses to the NAND memory 104 so that the NAND controller 110 can optimize NAND access via the translation cache 114 and translation tables 112.

Figure 2:
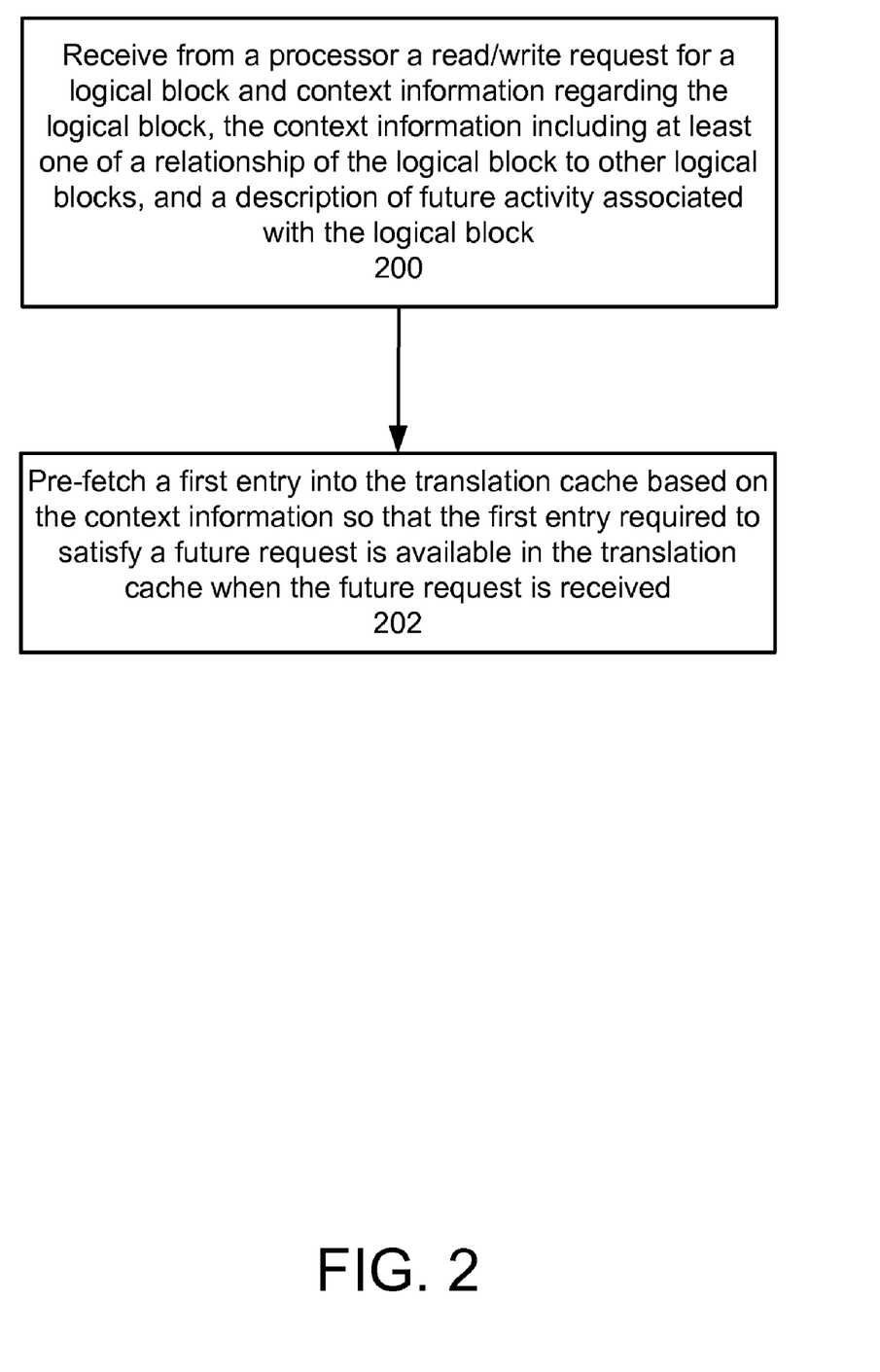
FIG. 2 is a flow diagram illustrating an example process for using channel tags in memory components to optimize logical-to-physical address translations.

FIG. 2 is a flow diagram illustrating a process for using channel tags in memory components, such as the NAND memory 104, for optimizing logical to physical address translations in accordance with an exemplary embodiment. The process assumes that the translation cache 114 contains a subset of the entries from the translations tables 112 for mapping logical block addresses to physical locations. The process may begin by the NAND memory 104 receiving from the processor 102 a read/write request for a logical block and context information regarding the logical block, the context information including at least one of a relationship of the logical block to other logical blocks, and a description of future activity associated with the logical block (block 200).

According to one embodiment, the context information may include a channel identifier (ID) to describe the relationship of the logical block to other logical blocks. In one embodiment, the channel ID identifies a particular channel associated with either an operating system (OS) function or an application executing on the processor 102, and may correspond to a file handle associated with the OS function or an application. Through the channel ID, information regarding past activity may be communicated.

In a further embodiment, the context information may also include an expected future behavior (EFB) field to describe the future activity associated with the channel ID. The processor 102 sends the channel ID and the expected future behavior (EFB) field with the read and write request sent to the NAND memory 104 to enable the NAND memory 104 to optimize the scheduling of operations in the NAND memory 104, including logical to physical address translations.

In response to receiving the context information (e.g., the channel ID and EFB field) regarding a logical block, the NAND memory 104 pre-fetches a first entry into the translation cache 114 based on the context information so that the first entry required to satisfy a future request is available in the translation cache 114 when the future request is received (block 202).

As used herein, pre-fetch operations performed on translation cache 114 may include reading the translation tables 112 to search for an entry or entries corresponding to one or more logical blocks correlated to the context information, and updating entries in the translation cache 114 with the entries, which may include discarding old entries. As stated above, however, reading the translation tables 112 can be time consuming.

Accordingly, in one further exemplary embodiment, the pre-fetch operations may be performed on the translation cached 114 during surplus bandwidth of the NAND memory 104 to minimize any latency of accessing the translation tables.

To explain the source of the surplus bandwidth, consider that data is written and read from pages in the NAND array 108, with a typical page size today being 2048 bytes (plus additional data in the "spare" area). Some NAND memories have 8-bit interface and some have 16-bit interfaces. A 16-bit interface can transfer twice the number of bytes per cycle than an 8-bit interface. To read data takes a read strobe and to write data takes a write strobe. The cycle times for these strobes can be as high as 40 MHz. For the processor 102 to read a block, it is necessary to issue the commands, wait for a tR page read access latency, and clock all 2048 (plus spare) bytes out of the NAND memory 104. The effective throughput rate is the page size of 2048 bytes divided by the sum of all of the component times. The end result of all of the component times using the example performance numbers given is that an 8-bit interface has a read throughput of 20 MB/sec. If read caches are present, back-to-back operations of sequential pages can partially or completely hide the tR page access latency and a throughput of 40 MB/sec can be approached. A 16-bit interface has a single read throughput of 26 MB/sec using the performance numbers quoted, and with read caching can easily provide over 60 MB/sec of throughput. Depending on the interface, the read bandwidth of the NAND memory 104 may exceed the read bandwidth supported by the interface. For example, an SD Card standard has a maximum frequency of the clock of 56 MHz but the data width is only 4 bits, so the maximum theoretical read bandwidth is 28 MB/sec. Thus, the surplus bandwidth of the NAND memory 104 can be used to perform translation cache pre-fetch operations as predicted by the EFB field.

In yet a further embodiment, the NAND memory 104 tracks multiple read/write requests received from the processor 102 on a per channel ID basis, and uses the absence of the read/write requests to indicate idle periods when no read/write requests are being processed by the NAND memory 104. In this embodiment, the NAND memory 104 may perform the pre-fetch operations on translation cache 114 during the idle periods to reduce latency of the translation table access, as further described below with respect to FIG. 6.

According to one exemplary embodiment, by enabling the NAND memory 104 to receive from the processor 102 not only information about a logical block being accessed and whether the request is a read or write, but also other context, including the logical block's relation to other logical blocks and the logical block's relation to past and future activity, the NAND memory 104 is provided with a global view of the semantics of the logical block accesses. This allows the NAND memory 104 to optimize data availability in the translation cache 114 to satisfy logical to physical translations of future logical block accesses. Such optimization minimizes translation cache misses, and thereby masks the access latency of the translation tables 112, particularly when performed during surplus bandwidth or idle periods of the NAND memory 104.

Figure 3:
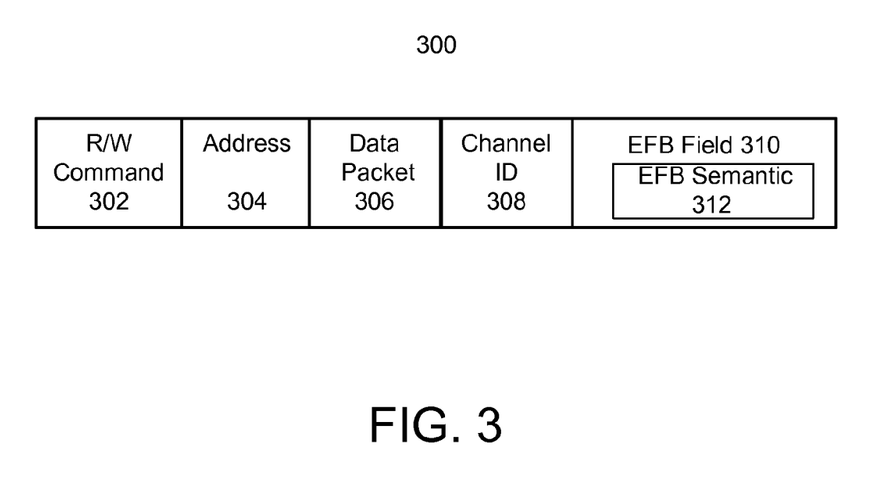
FIG. 3 is a diagram illustrating an example format of a read/write request for optimizing translations.

FIG. 3 is a diagram illustrating a format of a read/write request for optimizing translations in accordance with one exemplary embodiment. The format of the read/write request 300 includes a command 302, an address 304, an optional data packet 306, a channel ID 308, and an expected future behavior (EFB) field 310. The command 302 indicates whether the request is a read or a write; the address 304 contains a logical block on which the command is being performed; and in the case of a write command, the data packet 306 contains the data to be written.

The channel ID 308 identifies a particular channel associated with either an OS function or an application. The EFB field 310 indicates expected future activity associated with the channel ID 308 via the EFB semantic 312, which acts as an argument to the EFB field 310.

The purpose of the channel ID 308 is to enable the transmission of a correlation function of a series of reads and/or writes to a particular channel via the expected future behavior field 310. The EFB semantic 312 is used to indicate the type of future activity associated with channel ID 308. This correlation provided by the EFB can be either temporal, where there is regular periodicity to the channel activity or can be spatial where spatial is defined as a logical connectedness to the sequence of addresses (e.g. incrementing logical blocks). An example of expected future behavior is informing the NAND memory 104 that there will be large amounts of data read from a channel ID so that the managed NAND should be prepared to do the necessary address translations for contiguous blocks. Another example is using the expected future behavior to inform the NAND memory 104 that the NAND memory 104 is going to receive another read in 30 ms on the corresponding channel ID.

According to one exemplary embodiment, example types of EFB semantics 312 corresponding to types of future activities include:

a Create semantic for creating a channel ID by communicating to the NAND memory 104 that future read/write requests associated with the channel ID should be tracked;

a Destroy semantic for destroying a channel ID by communicating to the NAND memory 104 that future read/write requests for the channel ID are not expected and any cached data should be discarded;

a Multiple Contiguous Logical Blocks semantic for describing a number of contiguous logical blocks most likely to be requested;

a Discontinuity In Contiguous Logical Blocks for communicating that a logical block address will be changing soon for the channel ID; and a Periodic semantic for communicating a period of time when a next scheduled action for the channel ID is expected.

Although in the embodiment shown in FIG. 3, the channel ID 308 and EFB field 310 are shown as additional fields within the read/write request 300 and are therefore received by the NAND memory 104 as part of the read/write request 300, in alternative embodiments, the channel ID 308 and EFB field 310 may be sent separate from the read/write request 300, e.g., as separate commands. The channel ID 308 and EFB field 310 may also be sent as a combination thereof, where one is sent the read/write request 300 and the other is sent as a separate request (e.g., the channel ID 308 sent as an additional field and the EFB field 310 sent as a separate request).

The size of the channel ID 308 field may place a limit on the number of access threads that can be monitored. In addition, the limitations of the NAND controller 110 may additionally limit the number of access threads that can be monitored. Since it is not uncommon for modern OS environments with a minimal application load to have dozens of file handles open, this field size should not be unreasonably constrained. Also, modern OS environments typically cache file operations to varying degrees, so any given open file handle may or may not result in an access to an actual mass storage device, which in this case, is the NAND memory 104.

Figure 4:
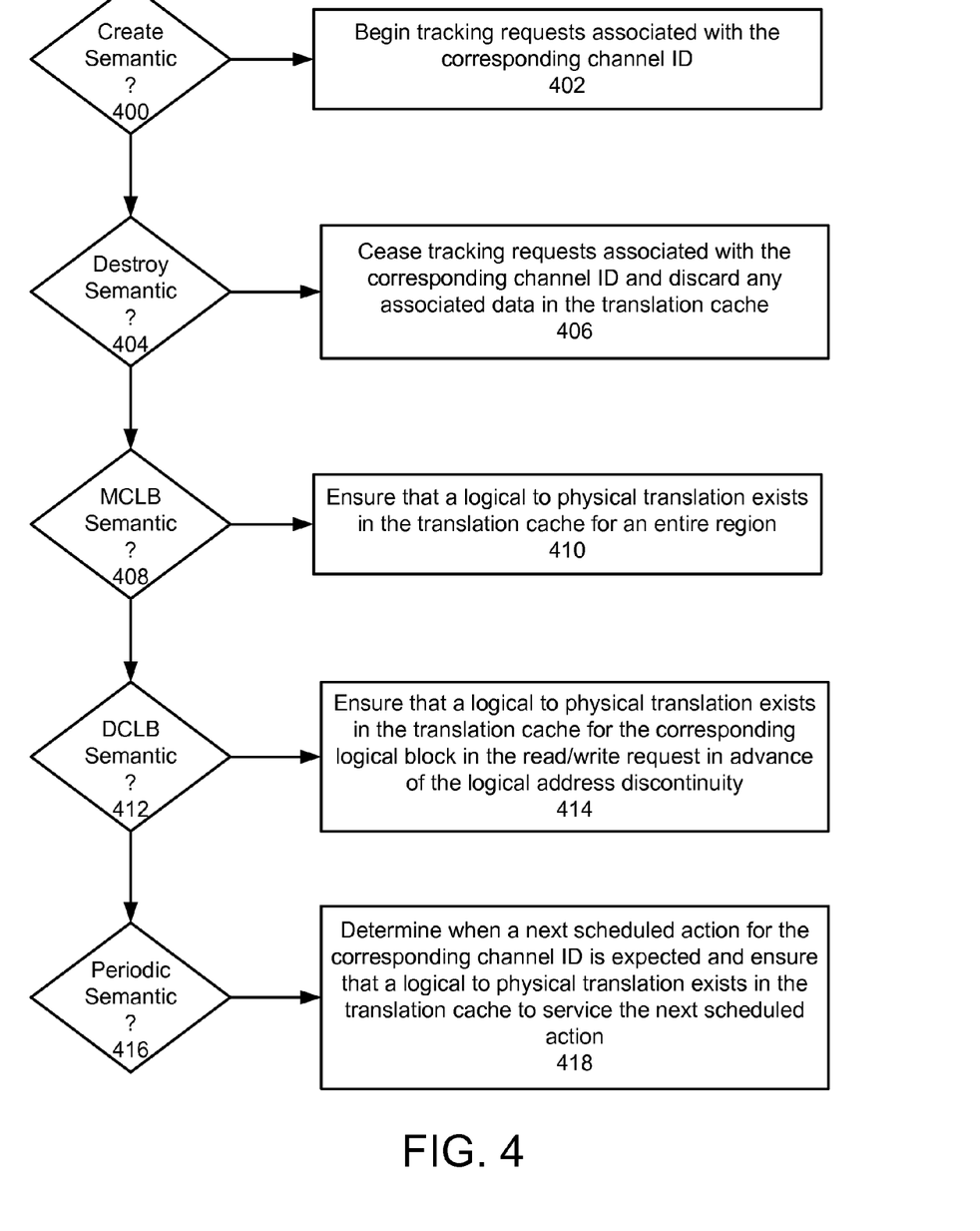
FIG. 4 is a diagram illustrating processing of an expected future behavior (EFB) field after a NAND receives a read/write request and a channel ID from a processor.

FIG. 4 is a diagram illustrating the processing of the EFB field 310 after the NAND controller 110 receives the read/write request 300 and the channel ID 308 from the processor. In response to determining that the EFB semantic 312 comprises a Create semantic (block 400), the NAND controller 110 begins tracking requests associated with the corresponding channel ID (block 402), which in some cases may change the state of the translation cache 114. Conversely, in response to determining that the EFB semantic 312 comprises a Destroy semantic (block 404), the NAND controller 110 ceases tracking requests associated with the corresponding channel ID and discards any associated data in the translation cache 114 (block 406).

Since the purpose of the channel ID 308 is to optimize the scheduling of operations in the NAND memory 104, the correspondence between file handles and channel IDs 308 may not be 1:1. Instead, channel IDs 308 are associated with file system operations that are active and ongoing. This is usually a small subset of the total number of files. As an example, consider two applications or two threads of an application that are communicating via a file stored on the NAND memory 104. One thread writes data into the file and the other thread reads data. The receiving thread may periodically activate and check the file size to see if the file size has changed, as a change in file size indicates that there is additional data to process. Since the file size is maintained in the OS file system tables, it is probably not necessary to activate the NAND memory 104. In this example, the receiving thread will wake up, interrogate the file system, receive an answer, and return to sleep, all of this occurs transparent to the NAND memory 104.

If, using the same example, the file size has changed, the receiving thread will have an open file handle (which the receiving thread created upon application invocation) and proceed to read the file. However, from the point of view of the NAND memory 104, the active transaction only occurs while the file is actively being read. In addition, there is a semantic blurring that can occur. The OS is aware that two threads have open file handles on the same file, and so has the ability to globally assign both read and write file handles to the same channel ID 308 via read/write requests 300. In this case the receiving thread (via the OS file system drivers) reuses the writing thread's channel ID 308 in read requests. When the writing thread actually writes the file, a channel ID 308 is created by using the Create semantic in the write request, changing the state of the translation cache 114. When the reading thread reads the file, it is optimal to use the translation already created for the writer's channel ID 308 to avoid having to perform the translation again.

In response to determining that the EFB semantic 312 comprises a Multiple Contiguous Logical Blocks (MCLB) semantic (block 408), the NAND controller 110 ensures that a logical to physical translation exists in the translation cache 114 for an entire region (block 410). The Multiple Contiguous Logical Blocks semantic is a method of breaking a large file transfer into atomic blocks such that translation cache pre-fetch operations can be performed during idle periods of the NAND controller 110. For example, a large MP3 file may be many contiguous megabytes in size, but is read in chunks of kilobytes and the EBF field 310 may be used to indicate to the NAND memory 104 that the next group of logical blocks will be read. Now the NAND memory 104 can perform translation cache pre-fetch operations in the background because the NAND memory 104 has prior knowledge that the processor 102 will continue to stream this channel ID in the future.

File reads will most likely read more than one logical block, with the number of actual logical blocks read being a function of the file size. The MCLB semantic may include an argument associated with the channel ID that specifies the number of logical blocks. Depending on the average file size, this argument may wish to have a maximum value larger or smaller. If the maximum number of blocks is too large, the translation cache 114 will likely be "polluted" with future physical translations that either may not actually occur or may occur significantly into the future. It may be reasonable to limit the maximum logical block count to 65536, i.e., a 16-bit unsigned integer. Current MMC (and their derivatives) specifications do not specify a logical block count field, they only either specify a single logical block read or a stream (i.e. unlimited length) read. A logical block count EFB serves to bridge those two extremes.

In response to determining that the EFB semantic 312 comprises a Discontinuity In Contiguous Logical Blocks (DCLB) semantic (block 408), the NAND controller 110 ensures that a logical to physical translation exists in the translation cache 114 for the corresponding logical block in the read/write request in advance of the logical address discontinuity (block 414). Files may not be allocated in contiguous logical blocks and this effect may vary according to the operating system. For example, FAT based file systems are notorious for their file fragmentation where new files tend to be written into whatever currently available hole exists in the free sector list. As time passes and files are deleted, the holes are not filled uniformly and the contents of a file may be scattered across may disconnected regions of logical blocks. Journaling file systems such as Journaling Flash File System (JFFS), or other UNIX file systems have this effect, but to a lesser effect as writes are allocated at the end of the file system and stale journal entries are garbage collected at the beginning of the file system. The journal is managed as a circular buffer. NTFS is a journaling file system but still suffers from some amount of file fragmentation. If a fragmented file is intended to be read, the DCLB semantic has the effect of announcing that the logical block address for the file will be changing soon for the channel ID 308 associated with the read request. In response, it is ensured that logical to physical translations exists in the translation cache 114 for the logical block in advance of the logical address discontinuity.

In response to determining that the EFB semantic 312 comprises a Periodic semantic (block 416), the NAND controller 110 determines when a next scheduled action for the corresponding channel ID 308 is expected and ensures that a logical to physical translation exists in the translation cache 114 to service the next scheduled action (block 418). The Periodic semantic informs the NAND controller 110 that an operation will resume with respect to the channel ID 308 within the indicated time period so that the managed NAND can prepare the translation cache 114 ahead of time.

The creation of a real-time schedule of activity is a requirement of many media applications, particularly high performance applications such as video. An example of this is shown in FIG. 5.

Figure 5:
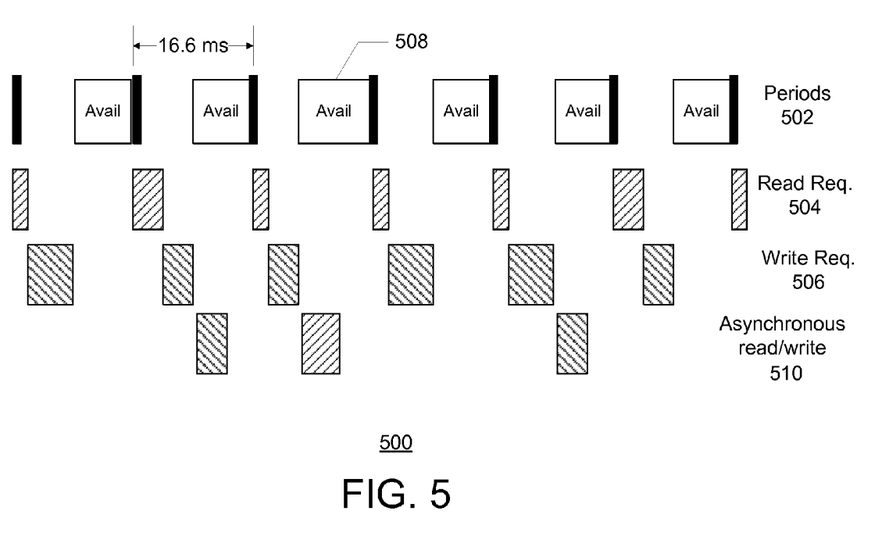
FIG. 5 is a diagram showing a portion of an exemplary schedule of memory request activity for an application that supports real-time media requirements.

FIG. 5 is a diagram showing a portion of an exemplary schedule of memory request activity for an application that supports real-time media requirements. In this example, a schedule of memory request activity 500 is shown for an application that supports a video stream at 30 frames per second (fps). The schedule shows that at 30 fps, the video stream has 16.6 ms periods 502, during which, read and write requests 504 and 506 to read/write logical blocks are made to the NAND memory 104 via the processor 102. After the read and write requests 504 and 506 are made, there is a time gap 508 left available in each period 502. Other memory activity may include asynchronous read/write requests 510 of the NAND memory 104 from asynchronous thread activity (such as from an e-mail client).

It will be helpful to be able to determine that there is a time correlation between successive media reads in the above periodic schedule as well as any time correlation between successive media writes. For this reason, the Periodic semantic is used to specify to the NAND memory 104 the period of time when the next scheduled request for this channel ID is expected. For example, in the above, the period is 16.6 ms. In one embodiment, the Periodic semantic includes an argument or pair of arguments to specify the time period. If there is a single argument, the meaning of this argument may be a multiplier of a fixed time. Alternatively, this single argument could be a frequency. In FIG. 5, the time period corresponds to a periodic schedule of 30 Hz. In this example, it may be sufficient to specify the integer 30 as the argument and the NAND memory 104 can use this to compute the interval. If there is a pair of arguments, one argument could be a time multiplier and the second argument could be a unit (or exponent). For example, the above would be specified as an integer of 16 (rounding down to make sure the NAND memory 104 is ready) along with a second argument that means "milliseconds". In this case, the NAND memory 104 is informed more precisely as to the actual time requirements of this channel ID, and not just that future behavior is "probable".

Figure 6:
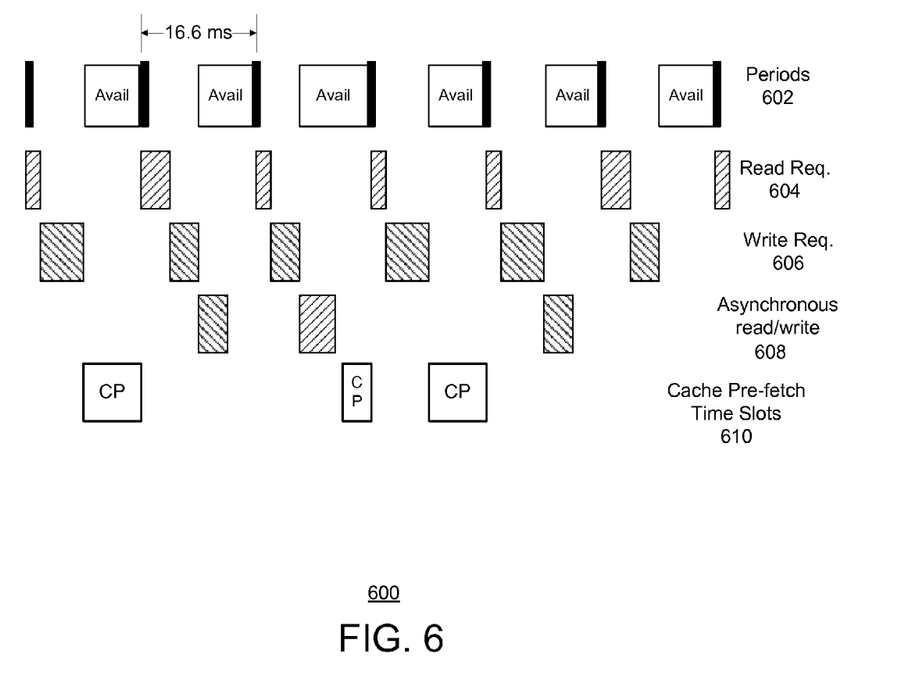
FIG. 6 is a diagram illustrating a portion of an exemplary real-time schedule for a NAND that takes into account activity of an application that supports real-time media requirements, such as a video stream.

In a further embodiment, the NAND controller 210 may create a real-time schedule of read/write requests received from the processor 102 based on arrival times of the read/write requests and the Periodic semantic. The NAND controller 210 may then use the real-time schedule to determine idle periods where no requests are being processed by the NAND memory 104.

FIG. 6 is a diagram illustrating a portion of an exemplary real-time schedule for a NAND memory 104 that takes into account activity of an application that supports real-time media requirements, such as a video stream. The real-time schedule 600 includes time periods 602 (e.g., 16.6 ms in length) during which an application may make read requests and write requests of the NAND memory 104 for processing the real-time media stream, which are received as read and write requests 604 and 606 and may have different channel ID's. The application's read and write requests 604 and 606 for the real-time media have priority and are processed first.

According to the exemplary embodiment, a time gap is left over in each period 602 during which at least one of two additional items may be scheduled. First, asynchronous read/write requests 608 of the NAND memory 104 from asynchronous thread activity (such as from an e-mail client) may be scheduled that take priority.

Second, cache pre-fetch (CP) time slots 610 may be scheduled during the idle periods of the NAND memory 104 for performing the pre-fetch operations on the translation cache 114, as described above.

A method and system for using channel tags in memory components for optimizing logical to physical address translations has been disclosed. The present invention has been described in accordance with the embodiments shown, and one of ordinary skill in the art will readily recognize that there could be variations to the embodiments, and any variations would be within the spirit and scope of the present invention. For example, the present invention can be implemented using hardware, software, a computer readable medium containing program instructions, or a combination thereof. Software written according to the present invention is to be either stored in some form of computer-readable medium such as memory or CD-ROM, or is to be transmitted over a network, and is to be executed by a processor. Consequently, a computer-readable medium is intended to include a computer readable signal, which may be, for example, transmitted over a network. Accordingly, many modifications may be made without departing from the scope of the appended claims.

I claim:

1. A method for performing logical to physical address translations in a NAND memory, the NAND memory including a translation cache containing a subset of a plurality of entries mapping logical block addresses to physical locations of the NAND memory, the method comprising:

receiving from a processor a read/write request that includes an address for a logical block and context information regarding the logical block, the context information including at least one of a relationship of the logical block to other logical blocks and a description of future activity associated with the logical block, wherein the context information is part of the read/write request; and pre-fetching a first entry into the translation cache based on the context information to facilitate anticipating a translation request to the translation cache from a future read/write request.

2. The method of claim 1, wherein pre-fetching the first entry into the translation cache further comprises:
  reading translation tables to search for the first entry corresponding to one or more logical blocks correlated to the context information; and
  updating the translation cache with the first entry.

3. The method of claim 1, the method further comprises:
  performing the pre-fetching during surplus bandwidth of the NAND memory where the surplus bandwidth is an idle time of the NAND memory from a higher bandwidth than a host.

4. The method of claim 1, the method further comprises:
  tracking multiple read/write requests received from the processor;
  using an absence of the read/write requests to indicate idle periods when no read/write requests are being processed by the memory; and
  performing the pre-fetching during the idle periods.

5. The method of claim 1, wherein the context information includes a channel identifier (ID) that describes the relationship of the logical block to other logical blocks.

6. The method of claim 5, wherein the context information includes an expected future behavior (EFB) field that describes the future activity associated with the channel ID.

7. The method of claim 6, wherein the EFB field further includes at least one of:
  a semantic for creating the channel ID, and a semantic for destroying the channel ID.

8. The method of claim 6, wherein the EFB field further includes a semantic for describing a number of contiguous logical blocks most likely to be requested.

9. The method of claim 6, wherein the EFB field further includes semantic for communicating that a logical block address will be changing for the channel ID.

10. The method of claim 6, wherein the EFB field further includes a periodic semantic for communicating a period of time when a next scheduled action for the channel ID is expected.

11. The method of claim 10, further comprising:
  creating a real-time schedule of requests based on arrival times of multiple read/write requests received from the processor, and the periodic semantic;
  using the real-time schedule to determine idle periods where no requests are being processed by the memory; and
  scheduling cache pre-fetch time slots during the idle periods for performing prefetching on the translation cache.

12. The method of claim 5, wherein the channel ID corresponds to one of a file handle and a process associated with the logical block.

13. A memory comprising:
  a memory array comprising physical locations;
  a translation table containing a plurality of entries mapping logical block addresses to the physical locations of the memory array;
  a translation cache to cache a subset of the plurality of entries from the translation table; and
  a memory controller in communication with the memory array, the translation table, and the translation cache, wherein the memory controller is configured to perform memory management functions for the memory array, including;
  receiving from a processor a read/write request including an address of a logical block and context information regarding the logical block, the context information including at least one of a relationship of the logical block to other logical blocks or a description of future activity associated with the logical block; and
  pre-fetching a first entry from the translation table into the translation cache based, at least in part, on the context information to optimize servicing a future read/write request associated with the read/write request.

14. The memory of claim 13, wherein the memory is a NAND memory having a NAND array and a NAND controller.

15. The memory of claim 13, wherein the memory controller performs the pre-fetching during surplus bandwidth of the memory, wherein the surplus bandwidth is an idle time of the memory from a higher bandwidth than a host.

16. The memory of claim 13, wherein the memory controller is further functional to:
  track multiple read/write requests received from the processor;
  use an absence of the read/write requests to indicate idle periods when no read/write requests are being processed by the memory; and
  perform the pre-fetching during the idle periods.

17. The memory of claim 13, wherein the context information includes a channel identifier (ID) that describes the relationship of the logical block to other logical blocks in the memory.

18. The memory of claim 17, wherein the context information includes an expected future behavior (EFB) field that describes the future activity associated with the channel ID.

19. The memory of claim 18, wherein the EFB field further includes at least one of:
  a semantic for creating the channel ID, and a semantic for destroying the channel ID.

20. The memory of claim 18, wherein the EFB field further includes a semantic for describing a number of contiguous logical blocks most likely to be requested.

21. The memory of claim 18, wherein the EFB field further includes a semantic for communicating that a logical block address will be changing for the channel ID.

22. The memory of claim 18, wherein the EFB field further includes a periodic semantic for communicating a period of time when a next scheduled action for the channel ID is expected.

23. The memory of claim 22, wherein the memory controller is further functional to:
  create a real-time schedule of requests based on arrival times of multiple read/write requests received from the processor, and the periodic semantic;
  use the real-time schedule to determine idle periods where no requests are being processed by the memory; and
  schedule cache pre-fetch time slots during the idle periods for performing prefetch operations on the translation cache.

24. The memory of claim 18, wherein one of the channel ID and EFB field is received separate from the read/write request.

25. An executable software product stored on a non-transitory computer-readable medium containing program instructions for performing logical to physical address translations in a memory, the memory including a translation cache containing a subset of a plurality of entries mapping logical block addresses to physical locations of the memory, the program instructions for:
  receiving from a processor a memory read/write request including an address of a logical block and context information that describes a relationship of the logical block to other logical blocks and a description of future activity associated with the logical block; and
  pre-fetching a first entry into the translation cache based, at least in part, on the context information.

* * * * *